(12) United States Patent
Kitao et al.

(10) Patent No.: US 7,585,592 B2
(45) Date of Patent: Sep. 8, 2009

(54) POSITIVE ELECTRODE AND NONAQUEOUS ELECTROLYTE SECONDARY BATTERY

(75) Inventors: Hideki Kitao, Kobe (JP); Toyoki Fujihara, Naruto (JP); Naoya Nakanishi, Tokushima (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 337 days.

(21) Appl. No.: 11/390,362

(22) Filed: Mar. 28, 2006

(65) Prior Publication Data
US 2006/0222948 A1 Oct. 5, 2006

(30) Foreign Application Priority Data
Mar. 29, 2005 (JP) ............................. 2005-093548

(51) Int. Cl.
*H01M 4/58* (2006.01)
*H01M 4/00* (2006.01)
*H01M 4/50* (2006.01)

(52) U.S. Cl. .................. 429/231.95; 429/223; 429/224; 429/231.3

(58) Field of Classification Search .............. 429/231.1, 429/223, 224, 231, 3; 252/182.1
See application file for complete search history.

(56) References Cited

FOREIGN PATENT DOCUMENTS

| EP | 1 117 145 | * | 7/2001 |
|----|-----------|---|--------|
| JP | 9045326 | * | 2/1997 |
| JP | 2000-77071 A | | 3/2000 |

* cited by examiner

*Primary Examiner*—Patrick Ryan
*Assistant Examiner*—Thomas H. Parsons
(74) *Attorney, Agent, or Firm*—Kubovcik & Kubovcik

(57) ABSTRACT

A positive electrode for a secondary battery and a secondary battery. A mixture of at least a lithium metal oxide with a hexagonal crystal structure (belonging to the R3m space group) containing nickel (Ni) and a lithium manganese oxide with a rhombic crystal structure (belonging to the Pmmn space group) is used for the positive electrode active material. Furthermore, it is preferable for the lithium metal oxide described above to include manganese (Mn) and more preferable for cobalt (Co) to be included to improve the stability of the crystal structure. In addition, it is preferable for the proportion of the lithium manganese oxide in the mixture described above to be from 20% by weight to 80% by weight.

11 Claims, 3 Drawing Sheets

POSITIVE ELECTRODE AND NONAQUEOUS ELECTROLYTE SECONDARY BATTERY

CROSS-REFERENCE TO RELATED APPLICATIONS

This application claims priority of Japanese patent application No. 2005-093548 filed Mar. 29, 2005, which is incorporated herein by reference.

FIELD OF THE INVENTION

The present invention relates to a positive electrode and to a nonaqueous electrolyte secondary battery comprising the positive electrode, a negative electrode and a nonaqueous electrolyte.

BACKGROUND OF THE INVENTION

Nonaqueous electrolytes are used for high energy density secondary batteries and, for example, many nonaqueous electrolyte secondary batteries that are charged and discharged by moving lithium ions between a positive electrode and a negative electrode are in use.

These nonaqueous electrolyte secondary batteries are used as the sources of power for various portable devices, but there is currently a strong demand for nonaqueous secondary batteries capable of even higher energy density in view of the increased power consumption of increasingly multifunctional portable devices.

In recent years, lithium manganese oxides have received attention as inexpensive materials for a positive electrode active material because they use manganese, for which there are more abundant resources than for lithium cobalt oxide, which has conventionally been used as a positive electrode active material.

In nonaqueous electrolyte secondary batteries that use lithium-manganese oxides, which have rhombic crystal systems (belonging to the Pmmn space group) for the positive electrode active material, the discharge potential is low at 3 V, and there is a wide range (regenerative output characteristics) where large current charging is possible.

However, along with the discharge capacity being low in the nonaqueous electrolyte secondary batteries described above, the discharge capacity decreases as the charging cycle becomes longer.

Furthermore, lithium manganese oxide with a spinel structure is used for a positive electrode active material, but the drop in discharge capacity is remarkable when the battery is kept at high temperatures.

Therefore, controlling the reduction in discharge capacity when high temperatures are maintained by using a lithium-nickel-cobalt composite oxide with a hexagonal crystal system (belonging to the R3m space group) and lithium manganese oxide with a spinel structure for the positive electrode active material has been proposed (for example, Japanese Patent Laid-open Publication No. 2000-77071).

OBJECT OF THE INVENTION

However, neither large regenerative output characteristics nor high discharge capacity can be obtained by using lithium manganese oxide with a spinel structure and having a discharge potential of around 4 V in the conventional nonaqueous electrolyte secondary battery described above.

It is an object of the present invention to provide a positive electrode and a nonaqueous electrolyte secondary battery capable of a high discharge capacity without lowering the regenerative output characteristics.

SUMMARY OF THE INVENTION

The positive electrode according to a first invention is capable of occluding and releasing lithium ions and contains a positive electrode active material. The positive electrode active material contains a mixture of at least a lithium metal oxide containing nickel and having a crystal system belonging to the R3m space group and a lithium manganese oxide with a crystal system belonging to the Pmmn space group.

EXPLANATION OF THE ELEMENTS

Figure 1:
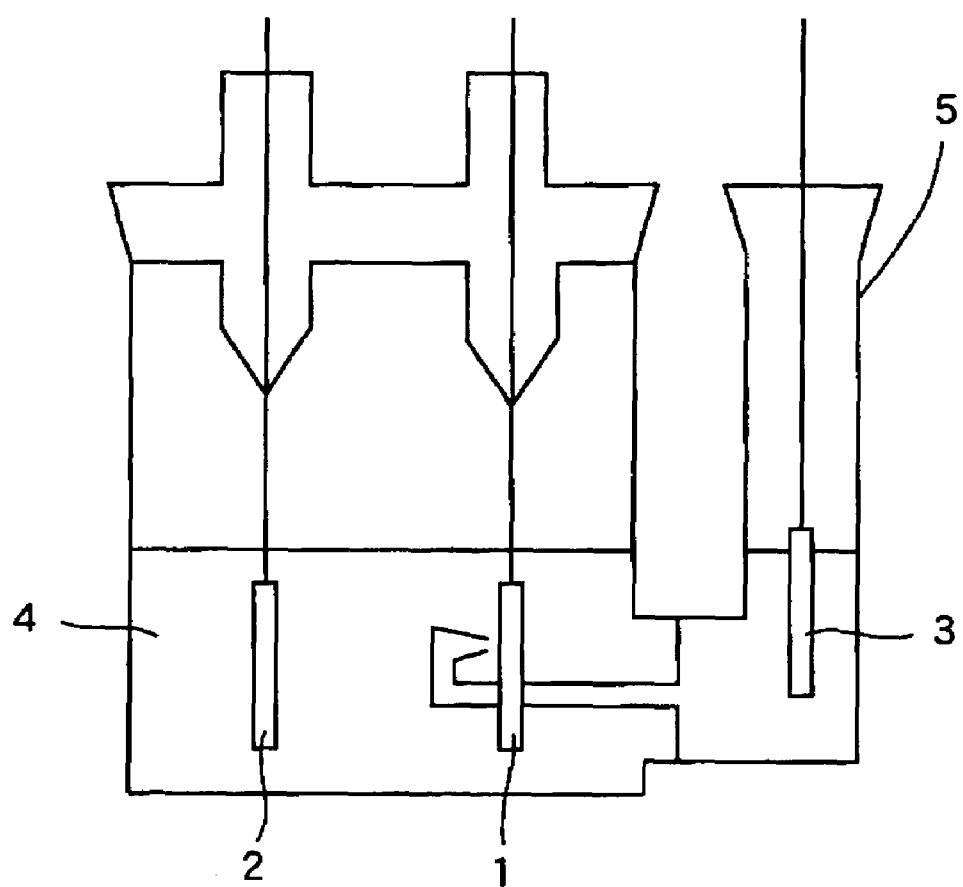
FIG. 1 is a schematic outline showing a three electrode beaker cell.

1: working electrode
2: counter electrode
3: reference electrode
4: nonaqueous electrolyte
5: beaker

DETAILED EXPLANATION OF THE INVENTION

In the positive electrode according to the present invention, a high discharge capacity may be obtained without reducing the regenerative output characteristics by using a mixture of the lithium metal oxide and the lithium manganese oxide for the positive electrode active material.

The lithium metal oxide containing nickel may contain manganese or may contain cobalt. In such cases, the discharge characteristics are good because the stability of the crystal structure is improved.

The average discharge potential of the lithium manganese oxide in the mixture may be lower than the average discharge potential for the lithium metal oxide. In this case, the regenerative output characteristics may be improved and a higher discharge capacity may be obtained.

The proportion of the lithium manganese oxide in the mixture may be from 20% by weight to 80% by weight. In this case, the regenerative output characteristics can be greatly improved and an even higher discharge capacity can be obtained.

The nonaqueous electrolyte secondary battery according to the second invention is provided with the positive electrode according to the first invention, a negative electrode capable of occluding and releasing lithium and a nonaqueous electrolyte.

In the nonaqueous secondary battery according to the present invention, a high discharge capacity may be obtained without reducing the regenerative output characteristics by using the positive electrode according to the first invention described above.

DESCRIPTION OF PREFERRED EMBODIMENT

The positive electrode and the nonaqueous electrolyte secondary battery according to the present embodiment are described below with reference to the drawings.

The nonaqueous electrolyte secondary battery according to the present embodiment comprises a positive electrode, negative electrode and a nonaqueous electrolyte. Materials and the thickness, concentration and density of the materials are described below. It is of course understood that the present invention is not limited to these materials. The present invention can be modified within the scope and spirit of the appended claims.

Metallic lithium, lithium alloys, graphite and other carbon materials, and the like, which are capable of occluding and releasing lithium (Li) ions are used for the negative electrode.

In the present embodiment, a mixture of at least a lithium metal oxide with a hexagonal crystal system (belonging to the R3m space group) containing nickel (Ni) and a lithium manganese oxide with a rhombic crystal system (belonging to the Pmmn space group) is used for the positive electrode active material.

Furthermore, it is preferable for the lithium metal oxide containing nickel to include manganese (Mn). It is more preferable for cobalt (Co) to be included to improve the stability of the crystal structure.

More specifically, it is preferable to use $Li_aMn_xNi_yCo_zO_2$, which is a lithium-transition metal oxide, for the lithium metal composite oxide described above. Moreover, a, x, y and z each satisfy $0 \leq a \leq 1.3$, $x+y+z \leq 1$, $0 \leq x \leq 0.8$, $0 < y \leq 0.5$ and $z \geq 0$, respectively. The lithium metal oxide used in the present embodiment will be described specifically in the following.

The lithium-transition metal composite oxide can contain at least one element selected from a group including boron (B), fluorine (F), magnesium (Mg), aluminum (Al), titanium (Ti), chromium (Cr), vanadium (V), iron (Fe), copper (Cu), zinc (Zn), niobium (Nb), zirconium (Zr) and tin (Sn).

Furthermore, it is preferable to use $Li_pMn_qO_{(2+r)}$ for the lithium manganese oxide described above. Moreover, p, q and r, each satisfy $1 \leq p$, $0.5 \leq q \leq 1$ and $-0.5 \leq r \leq 0.5$, respectively. The lithium manganese oxide used in the present embodiment will be described specifically in the following.

The $Li_pMn_qO_{(2+r)}$ for the lithium manganese oxide described above can contain either nickel or cobalt, or both. In this case, a mole fraction of 0.5 or greater for manganese in the transition metals is preferable.

Furthermore, the $Li_pMn_qO_{(2+r)}$ for the lithium manganese oxide described above can contain at least one element selected from the group including boron, fluorine, magnesium, aluminum, titanium, chromium, vanadium, iron, copper, zinc, niobium, zirconium, tin, potassium and sodium.

As described above, it is preferable for the mixing ratio of the lithium-transition metal composite oxide and the lithium manganese oxide to be in the range of 1:9~9:1 by weight, and a range of 4:6~9:1 is more preferable.

In the following a specific example of a preparation method of the positive electrode used in the present embodiments is described.

Based on the description above, $LiNi_{0.4}Co_{0.3}Mn_{0.3}O_2$ is used as the lithium metal oxide in the present embodiment.

$LiNi_{0.4}Co_{0.3}Mn_{0.3}O_2$ was prepared by mixing $Li_2CO_3$ and $(Ni_{0.4}Co_{0.3}Mn_{0.3})_3O_4$ at a mole ratio of 1:1 and firing this mixture in an air atmosphere for 20 minutes at 900° C.

Furthermore, based on the description above, $LiMnO_2$ is used as the lithium manganese oxide in the present embodiment.

$LiMnO_2$ was prepared by immersing $KMnO_2$ in a 0.5 M (mol/l) aqueous solution of LiOH for 24 hours and then washing in water and drying.

The $LiNi_{0.4}Co_{0.3}Mn_{0.3}O_2$ and $LiMnO_2$ prepared in this manner are mixed in a range of 8:2~2:8 by weight to prepare the positive electrode active material.

After preparing a N-methyl-2-pyrrolidone solution in which this positive electrode active material, acetylene black as a conductive agent and polyvinylidene fluoride as a binder were dissolved such that the proportions by weight of the positive electrode material, the conductive agent and the binder are 90:5:5, a slurry was prepared for the positive electrode mixture by kneading.

The slurry prepared for the positive electrode mixture as described above was dried after being applied to an aluminum foil for a current collector. Subsequently, the positive electrode is completed by rolling the positive electrode slurry applied to the current collector with a pressure roller and applying a current collector tab to it.

[Preparation of the Negative Electrode]

Metallic lithium, lithium alloys or graphite and other carbon materials, which are capable of occluding and releasing lithium ions, are used for the negative electrode. Specifically, materials with large changes in potential during charging and discharging are used to improve the regenerative output characteristics.

Here, the regenerative output characteristics mentioned above are a range in which charging at large currents is possible, and the following describes specifics.

For example, in a nonaqueous electrolyte secondary battery with a 50% state of charge (SOC), $V_1$ is the voltage when power flows for t seconds at a current $I_1$, and $V_2$ is the voltage when power flows for t seconds at a current $I_2$ ($I_1 < I_2$). The maximum power $P_d$ for the discharge after t seconds is calculated using Equation (1) below, and the maximum output for charging $P_c$ is calculated using Equation (2) below.

$$P_d = (V_O - V_L)/R \cdot V_L \quad (1)$$

$$P_c = (V_H - V_O)/R \cdot V_H \quad (2)$$

In Equation (1) above, $V_O$ is calculated from $(V_1 \cdot I_2 - V_2 \cdot I_1)\cdot(I_2 - I_1)$, and R is calculated from the absolute value of $(V_1 - V_2)/(I_2 - I_1)$. $V_L$ is the discharge termination voltage (lower limit of voltage for use) (V).

In Equation (2) above, $V_O$ is calculated from $(V_1 \cdot I_2 - V_2 \cdot I_1)\cdot(I_2 - I_1)$, and R is calculated from the absolute value of $(V_1 - V_2)/(I_2 - I_1)$. $V_H$ is the charge termination voltage (upper limit of voltage for use) (V).

Having large regenerative output characteristics means the maximum output $P_c$ shown in Equation (2) is large.

[Preparation of the Nonaqueous Electrolyte]

An electrolytic salt dissolved in a nonaqueous solvent may be used for the nonaqueous electrolyte.

Cyclic carbonates, chain carbonates, esters, cyclic ethers, chain ethers, nitrites, amides and the like and combinations thereof used as nonaqueous solutions in normal batteries are illustrative of the nonaqueous solutions described above.

Ethylene carbonate, propylene carbonate, butylene carbonate and the like are illustrative of cyclic carbonates, and ones with some or all of their hydrogen fluorinated can be used. Trifluoropropylene carbonate, fluoroethyl carbonate and the like can be illustrated.

Dimethyl carbonate, methyl ethyl carbonate, diethyl carbonate, methyl propyl carbonate, ethyl propyl carbonate, methyl isopropyl carbonate and the like are illustrative of chain carbonates, and ones with some or all of their hydrogens fluorinated can be used.

Methyl acetate, ethyl acetate, propyl acetate, methyl propionate, ethyl propionate, γ-butyrolactone and the like are illustrative of esters. 1,3-dioxolan, 4-methyl-1,3-dioxolan, tetrahydrofuran, 2-methyltetrahydrofuran, propylene oxide, 1,2-butylene oxide, 1,4-dioxane, 1,3,5-trioxane, furan, 2-methylfuran, 1,8-cineol, crown ether and the like are illustrative of the cyclic ethers.

1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether and the like are illustrative of the chain ethers.

Acetonitrile and the like are illustrative of the nitriles, and dimethylformamide and the like are illustrative of the amides.

$LiPF_6$, $LiBF_4$, $LiCF_3SO_3$, $LiC_4LiCF_3SO_3$, $LiC_4F_9SO_3$, $LiN(CF_3SO_2)_2$, $LiN(C_2F_5SO_2)_2$, $LiAsF_6$, $LiN(CF_3SO_2)(C_4F_9SO_2)$, $LiC(CF_3SO_2)_3$, $LiC(C_2F_5SO_2)_3$, $LiClO_4$, $Li_2B_{10}Cl_{10}$, $LiB(C_2O_4)_2$, $LiB(C_2O_4)F_2$, $LiP(C_2O_4)_3$, $LiP(C_2O_4)_2F_2$ and $Li_2B_{12}Cl_{12}$ and the like and mixtures thereof can be used as the electrolytic salts described above.

Furthermore, inclusion of lithium salts as anionic oxalato complexes in the electrolytic salt described above is preferable and inclusion of lithium-bis(oxalato)borate is more preferable.

In the present embodiment, lithium hexafluorophosphate is added as the electrolytic salt to an aqueous solution where ethylene carbonate (EC) and diethyl carbonate (DEC) are mixed in a proportion of 3:7 by volume to provide a concentration of 1.0 mol/l for use as the nonaqueous electrolyte.

[Preparation of the Nonaqueous Electrolyte Secondary Battery]

The positive electrode prepared as described above is used as the working electrode and the negative electrode as the counter electrode, and metallic lithium is used as a reference electrode to prepare a three electrode beaker cell. Moreover, the three electrode beaker cell will be described in the following.

A nonaqueous electrolyte secondary battery was prepared by introducing the nonaqueous electrolyte described above into the three electrode beaker cell.

(Effects of the Present Embodiment)

In the present embodiment, a mixture of at least a lithium metal oxide with a hexagonal crystal system (belonging to the R3m space group) containing nickel and a lithium manganese oxide with a rhombic crystal system (belonging to the Pmmn space group) is used for the positive electrode active substance.

By the use of such mixture a high discharge capacity may be obtained without reducing the regenerative characteristics.

Furthermore, it is preferable for the proportions of the lithium metal oxide and the lithium manganese oxide in the mixture to be 8:2~2:8 by weight. By this means a higher discharge capacity may assuredly be obtained without reducing the regenerative characteristics.

EXAMPLE 1

First, the $LiNi_{0.4}Co_{0.3}Mn_{0.3}O_2$ for the lithium metal oxide and $LiMnO_2$ for the lithium manganese oxide that were prepared based on the embodiment described above were each analyzed using an X-ray diffraction device.

It was possible to confirm from the analytical results that the $LiNi_{0.4}Co_{0.3}Mn_{0.3}O_2$ had a hexagonal crystal system belonging to the R3m space group and the $LiMO_2$ had a rhombic crystal system belonging to the Pmmn space group.

In Example 1, $LiNi_{0.4}Co_{0.3}Mn_{0.3}O_2$ and $LiMnO_2$ are mixed in an 8:2 ratio by weight to prepare the positive electrode active material. Furthermore, the following three electrode beaker cell was prepared using a positive electrode containing this positive electrode active material.

FIG. 1 is a schematic outline showing the three electrode beaker cell.

As is shown in FIG. 1, the positive electrode is the working electrode 1, the negative electrode the counter electrode 2, and metallic lithium is used as the reference electrode 3, with these disposed in a predetermined position in the beaker 5. Furthermore, the three electrode beaker cell was prepared by introducing a nonaqueous electrolyte 4 into the beaker 5.

EXAMPLE 2

Other than mixing $LiNi_{0.4}Co_{0.3}Mn_{0.3}O_2$ and $LiMnO_2$ in a 5:5 ratio by weight to prepare the positive electrode active material, a three electrode beaker cell was prepared in the same manner as in Example 1.

EXAMPLE 3

Other than mixing $LiNi_{0.4}Co_{0.3}Mn_{0.3}O_2$ and $LiMnO_2$ in a 2:8 ratio by weight to prepare the positive electrode active material, a three electrode beaker cell was prepared in the same manner as in Example 1.

COMPARATIVE EXAMPLE 1

Other than using only $LiMnO_2$ for the positive electrode active material, a three electrode beaker cell was prepared in the same manner as in Example 1.

COMPARATIVE EXAMPLE 2

Other than using only $LiNi_{0.4}Co_{0.3}Mn_{0.3}O_2$ for the positive electrode active material, a three electrode beaker cell was prepared in the same manner as in Example 1.

COMPARATIVE EXAMPLE 3

Other than using $Li_{1.1}Mn_{1.9}O_4$ for the lithium manganese oxide and preparing the positive electrode active material by mixing $LiNi_{0.4}Co_{0.3}Mn_{0.3}O_2$ and the $Li_{1.1}Mn_{1.9}O_4$ above in a proportion of 2:8 by weight, a three electrode beaker cell was prepared in the same manner as in Example 1.

Moreover, in the present example, predetermined amounts of $Li_2CO_3$ and electrolytic manganese dioxide were mixed in, and this mixture was fired for 12 hours at 800° C. to prepare the $Li_{1.1}Mn_{1.9}O_4$ mentioned above.

Furthermore, from the results of analysis using an X-ray diffraction device on the $Li_{1.1}Mn_{1.9}O_4$ described above, it was found that the $Li_{1.1}Mn_{1.9}O_4$ had a hexagonal crystal structure and was a lithium manganese oxide with a spinel structure.

COMPARATIVE EXAMPLE 4

Other than using $Li_{1.1}Mn_{1.9}O_4$ for the lithium manganese oxide and preparing the positive electrode active material by mixing $LiNi_{0.4}Co_{0.3}Mn_{0.3}O_2$ and the $Li_{1.1}Mn_{1.9}O_4$ above in a proportion of 4:6 by weight, a three electrode beaker cell was prepared in the same manner as in Example 1.

COMPARATIVE EXAMPLE 5

Other than using $Li_{1.1}Mn_{1.9}O_4$ for the lithium manganese oxide and preparing the positive electrode active material by mixing $LiNi_{0.4}Co_{0.3}Mn_{0.3}O_2$ and the $Li_{1.1}Mn_{1.9}O_4$ above in a proportion of 6:4 by weight, a three electrode beaker cell was prepared in the same manner as in Example 1.

COMPARATIVE EXAMPLE 6

Other than using $Li_{1.1}Mn_{1.9}O_4$ for the lithium manganese oxide and preparing the positive electrode active material by mixing $LiNi_{0.4}Co_{0.3}Mn_{0.3}O_2$ and the $Li_{1.1}Mn_{1.9}O_4$ above in a proportion of 8:2 by weight, a three electrode beaker cell was prepared in the same manner as in Example 1.

COMPARATIVE EXAMPLE 7

Other than using only $Li_{1.1}Mn_{1.9}O_4$ for the positive electrode active material, a three electrode beaker cell was prepared in the same manner as in Example 1.

(Charge and Discharge Tests)

The charge and discharge tests described in the following were used on each of the three electrode beaker cells in Examples 1~3 and Comparative Examples 1~7.

Charging was carried out under a room temperature environment with a constant current of 1 mA until a charge termination voltage of 4.3 V (vs $Li/Li^+$) was reached, and after a ten minute rest, discharging was carried out at a constant current of 1 mA until a discharge termination voltage of 2.75 V (vs $Li/Li^+$) was reached.

With the charge and discharge test described above as one cycle, a ten-cycle charge and discharge test was run, and the discharge capacity retention was calculated. This discharge capacity retention was defined as the proportion (%) of the first cycle discharge capacity in the discharge capacity at the tenth cycle.

(Charge and Discharge Test Results and Evaluation)

Figure 2:
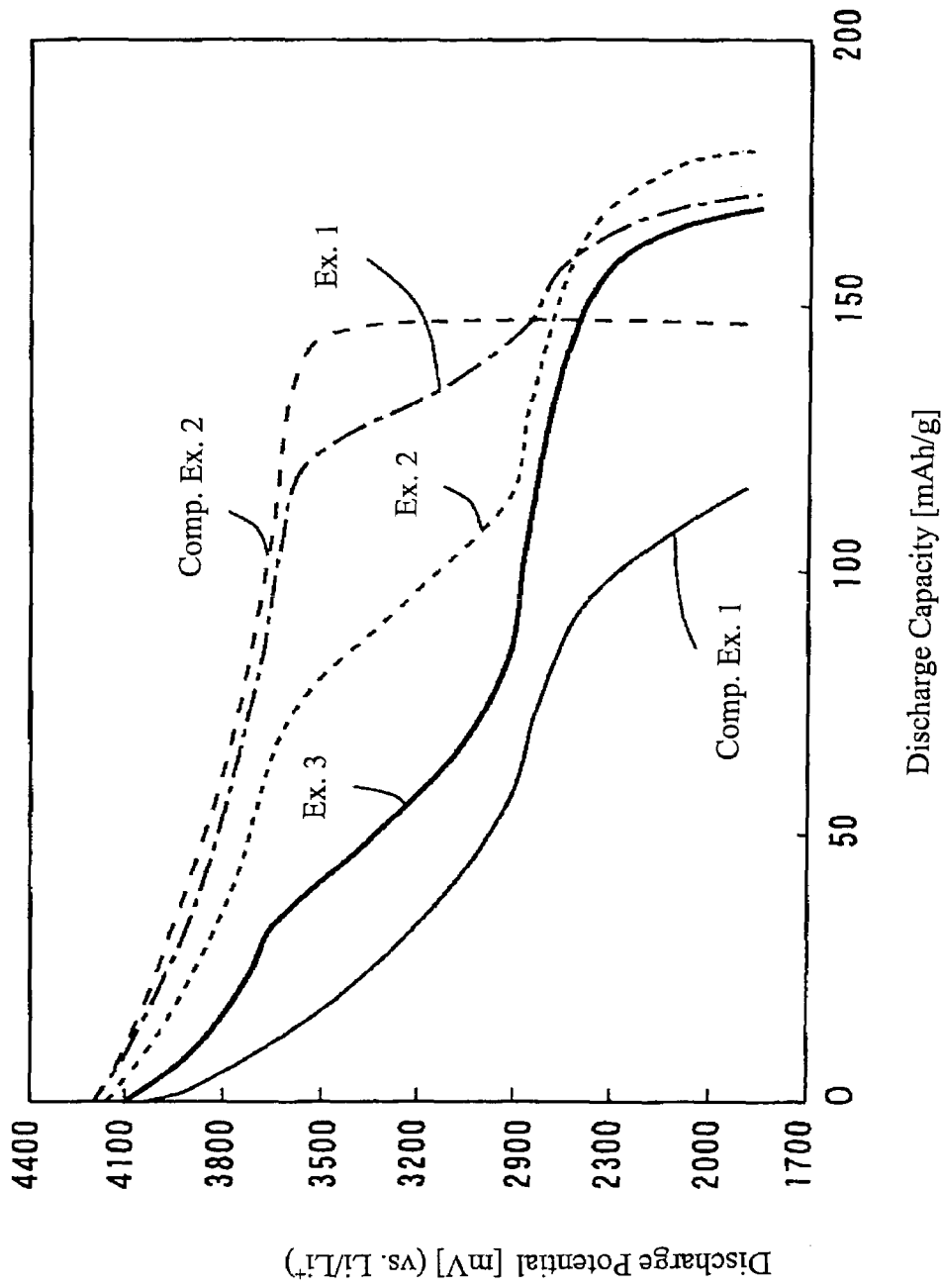
FIG. 2 is a graph showing the results of the charge and discharge tests for Examples 1~3 and Comparative Examples 1 and 2.

FIG. 2 is a graph showing the results of the charge and discharge tests for Examples 1~3 and Comparative Examples 1 and 2.

In Comparative Example 1, the average discharge potential was 3.2 V, and the regenerative output characteristics were large, but the discharge capacity dropped a large amount, as shown in FIG. 2. In Comparative example 2, the average discharge potential was 3.7 V, the regenerative output characteristics small, and the discharge capacity obtained was not very high. Here, the average discharge potential is calculated as the average value for the discharge potential from the beginning of discharging to termination (2.0 V).

On the other hand, in Examples 1~3, and especially Examples 2 and 3, there was no reduction in the regenerative characteristics, and a high discharge capacity was obtained.

Furthermore, in Examples 1~3 and Comparative Examples 1 and 2, the higher the mixture ratio of the $LiMnO_2$ used for the lithium manganese oxide in the positive electrode active material, the lower the average discharge potential with the reference electrode 3 as the standard.

Figure 3:
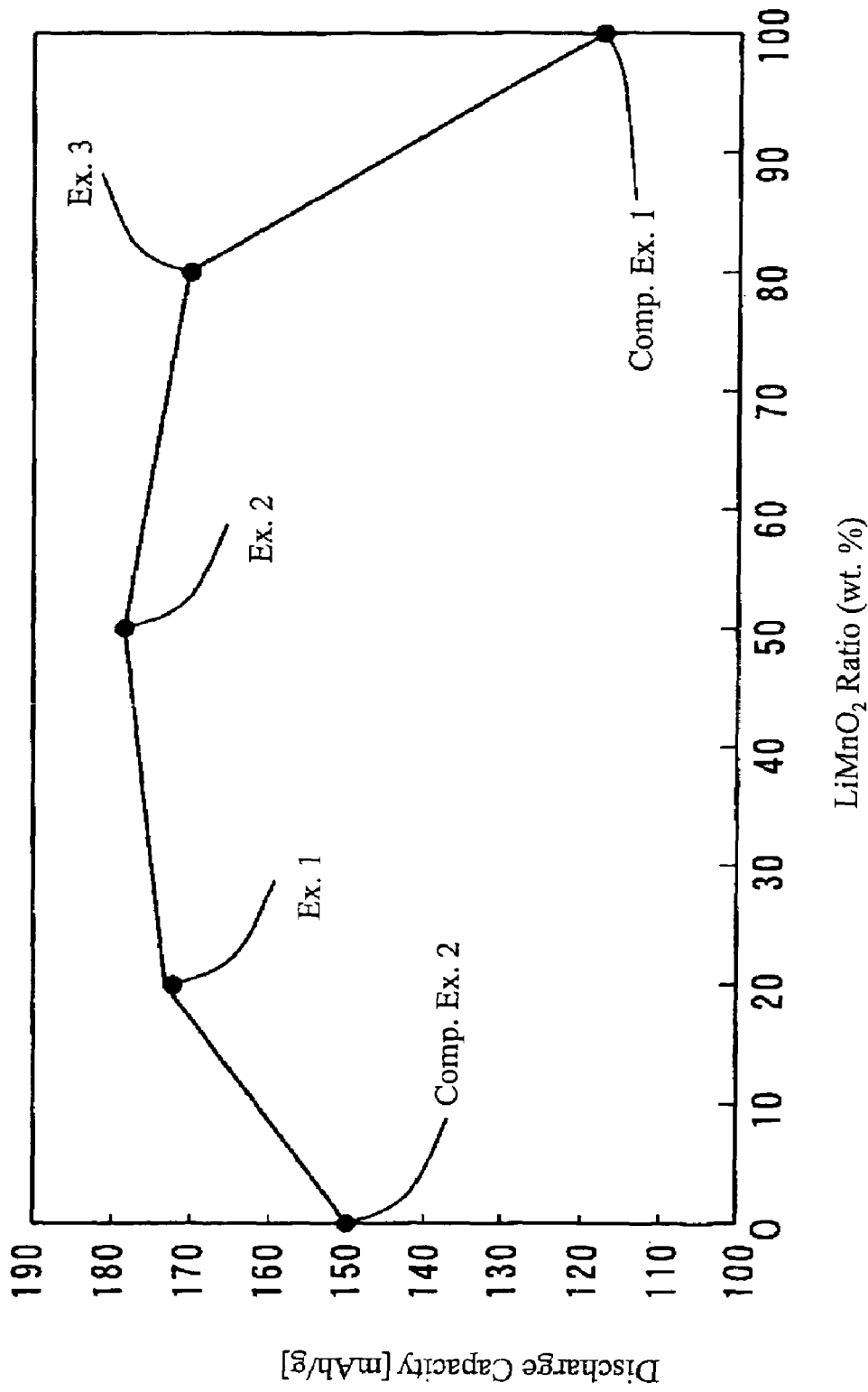
FIG. 3 is a graph showing the relationship of the discharge capacity with the proportion of $LiMnO_2$ in the mixture of $LiMnO_2$ and $LiNi_{0.4}Co_{0.3}Mn_{0.3}O_2$ used as the raw material for the positive electrode active material in the three electrode beaker cells in Examples 1~3 and Comparative Examples 1 and 2.

FIG. 3 is a graph showing the relationship of discharge capacity with the proportion of $LiMnO_2$ in the mixture of $LiMnO_2$ and $LiNi_{0.4}Co_{0.3}Mn_{0.3}$ used as the raw material for the positive electrode active material in the three electrode beaker cells in Examples 1~3 and Comparative Examples 1 and 2.

It was found that there was a remarkable improvement in the discharge capacity of the three electrode beaker cells in Examples 1~3, in which the mixture ratio above was 20%~80% by weight as shown in FIG. 3.

Furthermore, discharge capacity in the three electrode beaker cell in Comparative Example 1, which used only $LiMnO_2$ for the positive electrode active material, and the three electrode beaker cell in Comparative Example 2, which did not use any $LiMnO_2$ for the positive electrode active material was much lower than that in Examples 1~3 described above Next, Table 1 shows discharge capacity retention in the three electrode beaker cells in Examples 1~3 and Comparative Examples 1~7 after the charge and discharge tests.

TABLE 1

|  | $LiMnO_2$ Mixture ratio [wt. %] | $Li_{1.1}M_{1.9}nO_2$ Mixture ratio [wt. %] | $LiNi_{0.4}Co_{0.3}Mn_{0.3}O_2$ Mixture ratio [wt. %] | First Cycle Discharge Capacity [mAh/g] | Tenth Cycle Discharge Capacity [mAh/g] | Discharge Capacity Retention [%] |
|---|---|---|---|---|---|---|
| Example 1 | 20 | — | 80 | 172 | 143 | 83.1 |
| Example 2 | 50 | — | 50 | 180 | 115 | 64.0 |
| Example 3 | 80 | — | 20 | 173 | 103 | 59.3 |
| Comparative example 1 | 100 | — | 0 | 120 | 5.5 | 4.5 |
| Comparative example 2 | 0 | — | 100 | 149 | 140 | 93.9 |
| Comparative example 3 | — | 80 | 20 | 142 | 136 | 95.7 |
| Comparative example 4 | — | 60 | 40 | 133 | 122 | 91.7 |
| Comparative example 5 | — | 40 | 60 | 125 | 110 | 88.0 |
| Comparative example 6 | — | 20 | 80 | 116 | 100 | 86.2 |
| Comparative example 6 | — | 100 | 0 | 108 | 80 | 74.0 |

As shown in Table 1, the discharge capacity retention is high for Comparative Examples 2~7, but the discharge capacity is lower than that in Examples 1~3, and improvement in discharge capacity because of the prescribed mixtures of raw materials described above could not be confirmed.

Specifically, the discharge capacity in the first cycle in Examples 1~3 was much higher than that in the first cycle in Comparative Examples 2~7.

Moreover, the discharge capacity and discharge capacity retention rate were both very poor for Comparative Example 1.

From the above, it was found that using a mixture with $LiNi_{0.4}Co_{0.3}Mn_{0.3}O_2$ satisfying the a, x, y and z conditions for the embodiment described above and $LiMnO_2$, which has a lower average discharge potential than $Li_{1.1}Mn_{1.9}O_4$, was preferable.

POSSIBILITIES FOR APPLICATION IN INDUSTRY

The nonaqueous electrolyte secondary battery that includes the positive electrode according to the present invention may be used for various power sources, such as portable power sources and power sources for automobiles.

ADVANTAGES OF THE INVENTION

According to the present invention a high discharge capacity may be obtained without reducing the regenerative characteristics.

What is claimed is:

1. A positive electrode capable of occluding and releasing lithium ions and containing a positive electrode active material, wherein said positive electrode active material contains at least a mixture of a lithium metal oxide containing nickel and having a crystal structure belonging to the R3m space group and a lithium manganese oxide having a crystal structure belonging to the Pmmn space group, the proportion of said lithium manganese oxide in said mixture being from 20% by weight to 80% by weight.

2. The positive electrode according to claim 1, wherein said lithium metal oxide contains manganese.

3. The positive electrode according to claim 2, wherein said lithium metal oxide contains cobalt.

4. The positive electrode according to claim 3, wherein the average discharge potential of said lithium manganese oxide in said mixture is lower than the average discharge potential of said lithium metal oxide.

5. The positive electrode according to claim 2, wherein the average discharge potential of said lithium manganese oxide in said mixture is lower than the average discharge potential of said lithium metal oxide.

6. The positive electrode according to claim 1, wherein said lithium metal oxide contains cobalt.

7. The positive electrode according to claim 6, wherein the average discharge potential of said lithium manganese oxide in said mixture is lower than the average discharge potential of said lithium metal oxide.

8. The positive electrode according to claim 1, wherein the average discharge potential of said lithium manganese oxide in said mixture is lower than the average discharge potential of said lithium metal oxide.

9. A nonaqueous secondary battery provided with the positive electrode according to claim 1, a negative electrode capable of occluding and releasing lithium and a nonaqueous electrolyte.

10. A nonaqueous secondary battery provided with the positive electrode according to claim 2, a negative electrode capable of occluding and releasing lithium and a nonagneous electrolyte.

11. A nonaquecus secondary battery provided with the positive electrode according to claim 6, a negative electrode capable of occluding and releasing lithium and a nonaguecus electrolyte.

* * * * *